(12) United States Patent
Thalmann et al.

(10) Patent No.: US 7,641,804 B2
(45) Date of Patent: Jan. 5, 2010

(54) FILTER UNIT, FILTER DEVICE AND FILTRATION PROCESS FOR FLUIDS

(75) Inventors: Christian Thalmann, Speyer (DE);
Thomas Rodewaldt, Herxheim (DE);
Bernd Burkhart, Landau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/843,161

(22) Filed: Aug. 22, 2007

(65) Prior Publication Data

US 2008/0041795 A1 Feb. 21, 2008

Related U.S. Application Data

(63) Continuation of application No. PCT/EP2006/060252, filed on Feb. 24, 2006.

(30) Foreign Application Priority Data

Feb. 24, 2005 (DE) .................. 10 2005 008 924

(51) Int. Cl.
*B01D 25/00* (2006.01)
*B01D 25/02* (2006.01)
*B01D 25/32* (2006.01)

(52) U.S. Cl. .................. 210/767; 210/791; 210/225; 210/231; 210/433.1

(58) Field of Classification Search ............. 210/231, 210/455, 433.1
See application file for complete search history.

(56) References Cited

U.S. PATENT DOCUMENTS 3,343,681 A * 9/1967 Madden ........................ 210/343
3,478,874 A * 11/1969 Mclean et al. ............... 210/703
3,540,595 A * 11/1970 Edwards ...................... 210/321.72
4,016,081 A * 4/1977 Martinez et al. ............. 210/321.75
4,136,011 A * 1/1979 Joseph et al. ................ 210/167.08

(Continued)

FOREIGN PATENT DOCUMENTS

DE 102005008924 A1 * 8/2006

(Continued)

OTHER PUBLICATIONS

Definition of "Cross Flow Filtration" downloaded from Wikipedia.com on Jan. 5, 2009, 2 pages.*

(Continued)

*Primary Examiner*—Robert James Popovics

(57) ABSTRACT

A filter unit (10) and a filter device formed from several such units for filtering a fluid, especially a process fluid such as required for chip-removing machining processes. The filter units (10) each comprise a frame (11) and a filter medium (16). The frame (11) has support webs (12), which reinforce the frame (11) and support the filter medium (16). The support webs (12) are arranged on the downstream side (18) of the filter medium (16) to prevent clogging on the upstream side (17) and permit a simple removal of the filter cake. The filter units (10) are stacked on each other in alternating orientation such that the upstream sides (17) or the downstream sides (18) of two adjacent individual filter units (10) face each other. The frame (11) forms unfiltered fluid and filtered fluid flow nozzles (13), (14) through which the fluid to be filtered or the filtered fluid can flow.

9 Claims, 11 Drawing Sheets

U.S. PATENT DOCUMENTS

| | | | | | |
|---|---|---|---|---|---|
| 4,154,792 | A | * | 5/1979 | Miller et al. | 422/48 |
| 4,867,876 | A | * | 9/1989 | Kopf | 210/228 |
| 4,882,050 | A | * | 11/1989 | Kopf | 210/231 |
| 4,956,085 | A | * | 9/1990 | Kopf | 210/231 |
| 5,034,124 | A | * | 7/1991 | Kopf | 210/231 |
| 5,049,268 | A | * | 9/1991 | Kopf | 210/231 |
| 5,232,589 | A | * | 8/1993 | Kopf | 210/228 |
| 5,429,742 | A | * | 7/1995 | Gutman et al. | 210/321.75 |
| 5,593,580 | A | * | 1/1997 | Kopf | 210/321.75 |
| 5,681,464 | A | * | 10/1997 | Larsson | 210/321.84 |
| 6,916,420 | B2 | * | 7/2005 | Schmidt et al. | 210/321.75 |
| 6,929,743 | B2 | * | 8/2005 | Diel | 210/321.64 |
| 2003/0066794 | A1 | * | 4/2003 | Diel | 210/227 |
| 2008/0029450 | A1 | * | 2/2008 | Rodewaldt et al. | 210/340 |
| 2008/0041795 | A1 | * | 2/2008 | Thalmann et al. | 210/791 |

FOREIGN PATENT DOCUMENTS

| | | |
|---|---|---|
| EP | 0 508 645 A2 | 10/1992 |
| WO | WO 2006089944 A2 * | 8/2006 |
| WO | WO 2006089945 A1 * | 8/2006 |

OTHER PUBLICATIONS

International Search Report dated Sep. 14, 2006 with English translation of relevant portion (Four(4)pages).

* cited by examiner

FILTER UNIT, FILTER DEVICE AND FILTRATION PROCESS FOR FLUIDS

CROSS REFERENCE TO RELATED APPLICATIONS

This application is a continuation of international patent application no. PCT/EP2006/060252, filed Feb. 24, 2006 designating the United States of America and published in German on Aug. 31, 2006 as WO 2006/089944, the entire disclosure of which is incorporated herein by reference. Priority is claimed based on Federal Republic of Germany patent application no. DE 10 2005 008 924.0, filed Feb. 24, 2005.

BACKGROUND OF THE INVENTION

The invention relates to filter units and a filter device for filtering a fluid in accordance with the preamble of claims 1 and 9. The invention further relates to a filtration process in accordance with the preamble of claim 11.

Gutman et al., U.S. Pat. No. 5,429,742 (=EP 508,645) discloses a filter composed of stackable filter units for filtering a fluid. The filter units are constructed as stackable disks which have a plastic frame and a filter medium which is molded into the plastic frame. By stacking together a plurality of filter units, an unfiltered channel for the fluid being filtered is formed, which is connected to the upstream sides of the filter units. The filter units furthermore form a filtered channel, which is connected to the downstream side of the filter units. To form a filter, the stacked filter units are provided with end plates, such that the first end plate has an aperture for the unfiltered fluid and the second end plate has an aperture for the filtered fluid. The disclosed filter uses dead-end filtration, that is to say 100% of the introduced unfiltered fluid must pass through the filter units and exit the filter through the filtered channel. Filtered material deposits on the filter elements and a filter cake forms on the filter units, which the fluid being filtered must penetrate. When the filter cake becomes thick enough, the filter becomes obstructed and flow through the filter becomes almost impossible.

SUMMARY OF THE INVENTION

The object of the invention is to provide filter units, a filter device and a filtration process that can be used for reliable, simple and cost-effective filtration of a fluid.

These and other objects are achieved in accordance with the present invention by providing a filter unit for filtering a fluid, the filter unit comprising a frame and a filter medium mounted on and sealingly connected to the frame, the frame having an outer contour region which extends on both the upstream side and the downstream side of the filter medium, and forming an unfiltered flow nozzle for discharging unfiltered fluid upstream of the filter medium and a filtered flow nozzle for collecting filtered fluid downstream of the filter medium, and the frame further comprising a plurality of support webs disposed on the downstream side of the filter medium for supporting the filter medium, with the filter medium being connected to the support webs.

In accordance with a further aspect of the invention, the objects are achieved by providing a filter comprising a stack of at least two filter units as described above, the frames of the adjacent filter units sealingly adjoining each other, and the unfiltered fluid flow nozzles of adjacent filter units adjoining each other to form an unfiltered fluid flow channel and filtered fluid flow nozzles of the adjacent filter units adjoining each other to form a filtered fluid flow channel, and the support webs of the adjacent filter units facing and mutually supporting each other.

In yet another aspect of the invention, the objects are achieved by providing a filter device for filtering a fluid comprising a tank, an unfiltered fluid connection, a filtered fluid connection and a concentrate connection, wherein at least one filter as described above is disposed inside the tank, and the unfiltered fluid flow channel is connected to the unfiltered fluid connection and the concentrate connection, and the filtered fluid flow channel is connected to the filtered fluid connection.

In accordance with a still further aspect of the invention, the objects are achieved by providing a method of filtering a fluid comprising providing a filter device as described above; introducing unfiltered fluid into the filter unit stack through the unfiltered fluid connection and the unfiltered fluid flow channel into an unfiltered fluid zone arranged between facing upstream sides of the filter medium of two adjacent filter units; passing a portion of fluid through the filter medium of one filter unit to a filtered fluid zone arranged between facing downstream sides of the filter medium of the one filter unit and a third filter unit, whereby the fluid is filtered; discharging filtered fluid from the filtered fluid zone through the filtered fluid flow channel and the filtered fluid connection; and discharging a remaining portion of the unfiltered fluid as a concentrate from the unfiltered fluid zone through unfiltered fluid flow channel and the concentrate connection.

The filter unit according to the invention comprises a frame and a filter medium, such that the filter medium is sealingly connected to the frame. The filter medium can be a membrane or a fabric, with the pore size or mesh size adapted to the particles to be filtered. Suitable pore sizes for the filtration of fluids can range from approximately 0.3 to 1 μm. Fabrics normally have coarser mesh sizes. A thermoplastic material is preferably used for the filter medium, but other media suitable for filtration, such as metal or ceramics, may also be used. The frame is formed of a thermoplastic material, which may be unreinforced or reinforced with carbon fibers, glass fibers, glass beads or other materials. Advantageous synthetic resin materials include, for example, polyamide, polyethylene or polypropylene. The selection of the frame material should be adapted to the fluid being filtered so that the frame is resistant to the medium being filtered and to the process parameters, such as temperature. The frame has an outer contour region extending on both the downstream side and the upstream side of the filter medium. As used herein, the terms upstream and downstream refer to successive positions along a path of flow and not necessarily to a consistent physical direction. The frame furthermore has an inner contour, which forms an unfiltered flow nozzle, a filtered flow nozzle and support rails or webs. The filter medium is sealingly fixed to the unfiltered flow nozzle on the one hand and to the filtered flow nozzle on the other. The support webs may extend in any direction, e.g., horizontally and/or vertically to the outer contour region of the frame. The number and arrangement of the support webs may be selected as desired. They reinforce the outer contour region of the frame on the one hand and support the filter medium in flow direction on the other, so that the filter medium is protected against damage from excessive pressure forces. To this end, the filter medium is non-detachably fixed to the support webs on the downstream side. The support webs make it possible to realize even large-area filter units of inexpensive materials. Support webs may also be arranged on the upstream side to support the filter medium during backwashing.

The unfiltered flow nozzle is connected for communication with the upstream side of the filter medium, such that the height $H_{unfiltered}$ of the unfiltered flow nozzle corresponds to at least the height $H_{contour}$ of the outer contour region of the frame extending on the downstream side of the filter medium. With this geometric configuration, the fluid to be filtered can reach only the upstream side of the filter medium. The filtered flow nozzle is connected for communication with the downstream side of the filter medium, such that the height $h_{filtered}$ of the filtered flow nozzle corresponds to at least the height $h_{contour}$ of the outer contour region of the frame extending on the upstream side of the filter medium. Thus no unfiltered fluid can reach the downstream side of the filter medium.

If a thermoplastic material is used for both the frame and the filter medium, the filter medium can be inserted into the frame mold and the frame can be injection molded around it. The filter medium then melts in the region of the frame and bonds to the material of the frame to produce a non-detachable connection between the filter medium and the frame.

According to one advantageous embodiment of the invention, the support webs extend diagonally to the outer contour region of the frame. This gives greater rigidity to the frame and increases its resistance to pressure. Furthermore, flow channels are formed between the support webs, which rest crosswise on each other when a plurality of filter units is stacked. As a result, the filtered fluid must flow along these crossed flow channels. This ensures uniform support of the support webs of a filter unit against the adjacent filter unit.

Advantageously, the frame in the area of its outer contour region has a sealing contour on its end faces. On the first end face this sealing contour is configured as a concave contour and on the second end face as a convex contour. When a plurality of filter units is stacked together, the convex contour of the one filter unit therefore engages the concave contour of the adjoining filter unit. This creates a fluid-tight connection between the adjoining filter units, so as to avoid the need for additional sealing members. Because of the fluid tight joining of the filter units, the outer contour of the frame further forms a pressure-tight housing, within which the fluid flows.

In another advantageous embodiment of the invention, the frame has a centering contour on its end faces in the area of its outer contour region. This centering contour causes the adjoining filter units to be lined up exactly so as to prevent slippage and the formation of leakage points. This centering contour may be configured as a tongue-and-groove geometry extending linearly on the end face of the outer contour region. It is also conceivable, however, to arrange centering contours only over partial areas, which may be distributed around the circumference of the outer contour.

In a particularly advantageous embodiment, the centering contour and the sealing contour are combined in a common contour. This simplifies the geometry of the frame and makes it more cost effective to manufacture.

In a further development of the invention, the height $H_{unfiltered}$ of the unfiltered flow nozzle is greater than the height $H_{contour}$ of the outer contour region. This makes it possible for adjoining unfiltered flow nozzles to engage so as to produce a better joint between the unfiltered flow nozzles. In this case, the adjoining unfiltered flow nozzles can, in particular, be pressed together. In one advantageous embodiment, the unfiltered flow nozzle has a sealing shoulder disposed particularly in the region protruding over the height $H_{contour}$. In another embodiment of the unfiltered flow nozzle a circumferential projection may be formed which engages the unfiltered flow nozzle of the adjoining filter unit. This ensures a reliable seal of the unfiltered flow nozzles in relation to each other. The projection may be disposed either on the female part or on the male part.

The foregoing explanations regarding the configuration of the unfiltered flow nozzle apply analogously to the configuration of the filtered flow nozzle, such that the sealing geometry of the filtered flow nozzle corresponds to the sealing shoulder of the unfiltered flow nozzle.

The stack of filter units according to the invention has at least two filter units as described above. The frames of the individual filter units are sealingly connected to each other so as to form a volume within the frame. The unfiltered flow nozzles of the adjoining filter units contact each other to form an unfiltered fluid channel. The same is true for the filtered flow nozzles, which form a filtered fluid channel. The unfiltered fluid channel has openings communicating with the upstream side of the filter medium. The fluid being filtered flows through these openings to the filter medium. The filtered fluid channel has openings connecting the downstream side of the filter medium to the filtered fluid channel. Thus the filtered fluid can pass through these openings and reach the filtered fluid channel. The filter units have support webs on the upstream side of the filter media. The support webs of adjacent filter units contact each other, such that the support webs of the filter units rest on each other, thereby improving the stability of the filter unit stack. If the support webs extend diagonally, the support webs of the adjacent filter units extend crosswise to each other, so that the support webs contact each other only at the crossing points. Since the crossing points are distributed over the entire area, high stability is achieved. A flow of the filtered fluid toward the filtered fluid channel is furthermore ensured.

The unfiltered and filtered flow nozzles may each be integrally formed with the frame. The height of the nozzle is may be selected as desired, provided however, that the unfiltered flow nozzle of the first filter unit contacts the unfiltered flow nozzle of the second filter unit. To this end, the unfiltered flow nozzle may also be formed by an additional element that is detachably or non-detachably connected to the frame. An additional element may, for example, be bonded, welded or screwed on so as to produce a tight joint. What has been said about the unfiltered flow nozzle applies analogously to the filtered flow nozzle.

The filter device according to the invention is used to filter a fluid contaminated with particles. Such fluids may be gases or liquids, particularly coolants used in chip-removing machining processes producing small chip sizes. Small chip sizes ranging from approximately 1-10 μm may for example be created in grinding, honing or lapping operations. The filter device has a tank with an unfiltered fluid connection, a filtered fluid connection and a concentrate connection. Filter unit stacks of at least two filter units are formed of the above-described filter units and are inserted into the tank of the filter device. The filter unit stack is connected with the connections of the tank, so that the fluid being filtered can flow into the filter unit stack through the unfiltered fluid connection. The filtered fluid exits through the filtered fluid connection. The unfiltered concentrated fluid flows out of the filter device through the concentrate connection.

According to another further embodiment of the filter device, the filter unit stack is clamped with clamping members, particularly more than three, such that the clamping members are fixed in a distributor plate on the one hand and in a clamping plate on the other. This makes it possible to clamp the filter units into a filter unit stack. Clamping prevents leakage flows. Higher pressures can at the same time act within the filter unit stack to push the fluid through the filter medium or to suck the filtered fluid out of the filter unit stack.

The method for filtering a fluid according to the invention is carried out with one of the above-described filter devices. The fluid being filtered is introduced into the filter unit stack through the unfiltered fluid connection. The fluid flows through the unfiltered flow nozzle to the unfiltered side, which is disposed between the upstream sides of the filter medium. The fluid flows through the filter medium and thus reaches the filtered side disposed between the downstream sides of the filter units. The filtered fluid flows through the filtered flow nozzle to the filtered fluid connection and then exits the filter device. The concentrate flows through the unfiltered flow nozzles until it exits the filter device through the concentrate nozzle. The concentrate may be fed back into the unfiltered fluid via a recirculation line, such that an additional filter device may optionally be provided, so that the concentrate flows in a loop through the filter device. As an alternative, the concentrate may circulate through the filter device in a loop until no further filtration is possible. The heavily contaminated concentrate is then disposed of before new fluid is fed into the filter device for filtration.

According to another advantageous embodiment of the method for filtering a fluid, the filter units may be cleaned through a backwashing process. The filter cake which forms on the upstream side of the filter medium is thereby separated and removed from the filter unit stack, so that the capacity of the filter units is restored. A portion of the filtered fluid or some other rinsing fluid may be used for this backwashing process.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
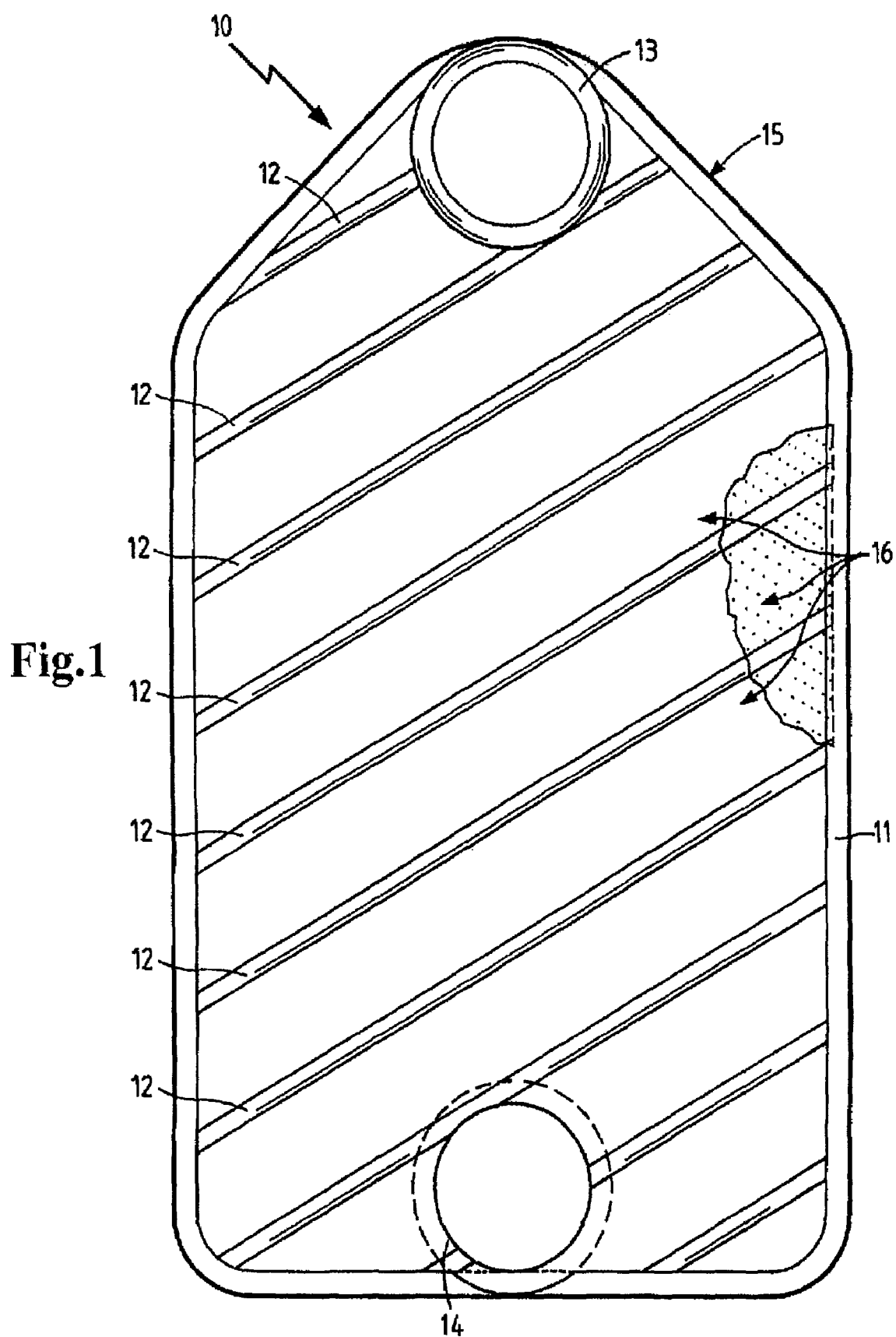
FIG. 1 shows a filter unit according to the invention.

FIG. 1 is a schematic representation of a filter unit 10. The filter unit 10 comprises a frame 11 with a circumferential outer contour region 15 and support rails or webs 12. The support webs 12 extend diagonally within the outer contour region 15. The support webs 12 are spaced apart from each other such that the largest possible flow area is available for the fluid being filtered while sufficient stability is produced for the outer contour region 15. The frame 11 further has an unfiltered flow nozzle 13 and a filtered flow nozzle 14. A flat filter medium 16, which is shown in part, is disposed within the outer contour region 15. The filter medium 16 is molded into the outer contour region 15. The filter medium 16 is furthermore joined to the support webs 12 and the unfiltered flow nozzle and the filtered flow nozzle 13, 14. Within the unfiltered flow nozzle and the filtered flow nozzle 13, 14, the filter medium 16 has a cut out opening.

Figure 2:
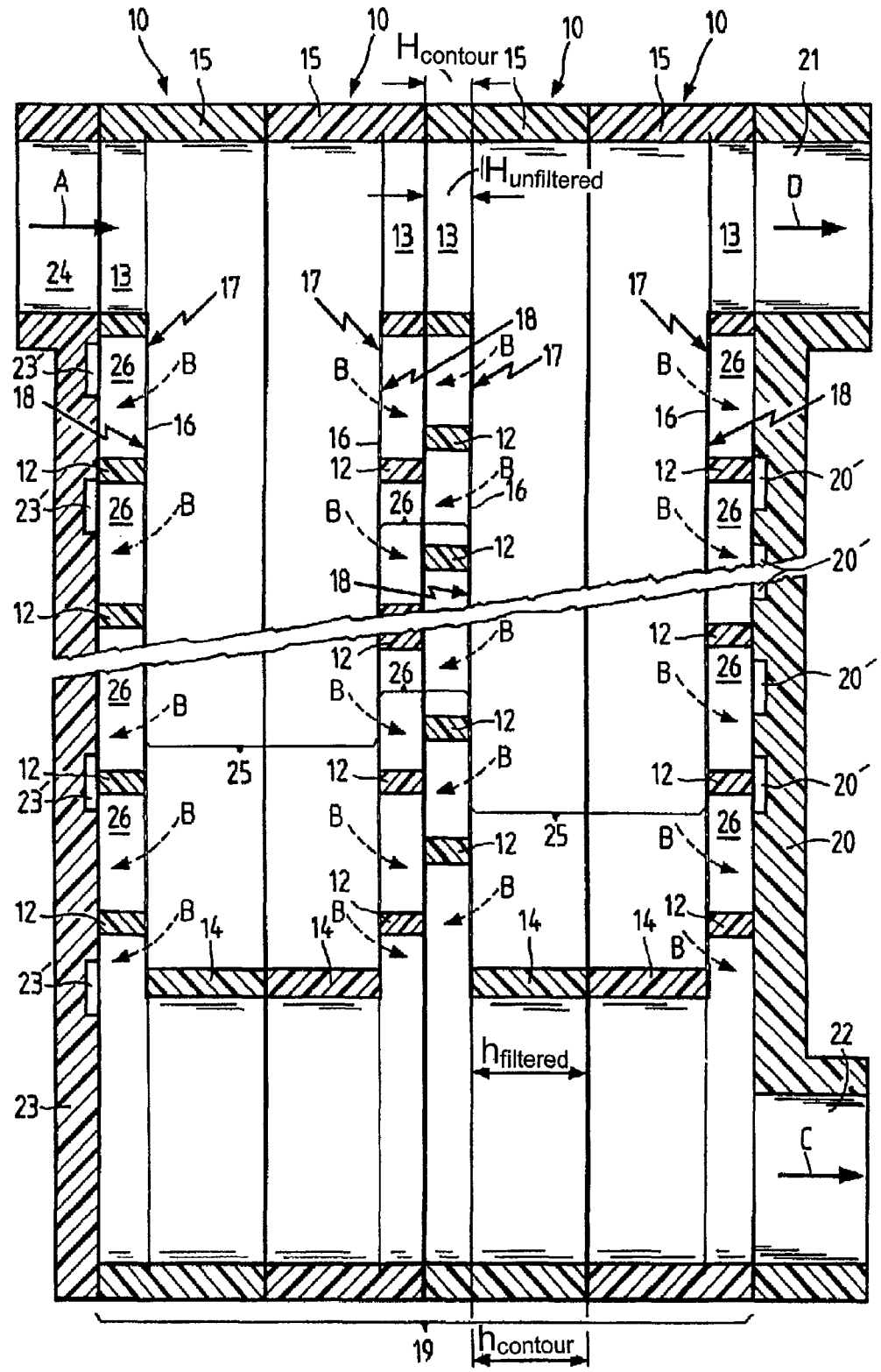
FIG. 2 is a sectional view of a filter device comprised of a stack of filter units according to the invention.

FIG. 2 is a sectional view of stacked filter units 10 depicted in FIG. 1. Parts corresponding to those of FIG. 1 are identified by the same reference numerals. The filter medium 16 has an upstream side 17 and a downstream side 18. The upstream side 17 admits the fluid to be filtered and is therefore in communication with the unfiltered flow nozzle 13. After the fluid has passed through the filter medium 16, the fluid flows from the downstream side 18 to the filtered flow nozzle 14. The individual filter units 10 contact each other so as to form a seal. The filter units 10 are arranged in such a way that the unfiltered flow nozzles and the filtered flow nozzles 13, 14 contact each other respectively to form a seal, such that the upstream sides 17 of two adjacent filter units 10 or the downstream sides 18 of the adjacent filter units 10 lie opposite each other. The unfiltered flow nozzle 13 has a height $H_{unfiltered}$, which corresponds to the height $H_{contour}$ of the outer contour region 15. The height $H_{contour}$ extends from the filter medium 16 in the same direction as the height $H_{unfiltered}$ of the unfiltered flow nozzle 13. Similarly, the filtered flow nozzle 14 has a height $h_{filtered}$, which equals the height $h_{contour}$ of the outer contour region 15. The sum of the heights $H_{contour}$ and $h_{contour}$ together with the thickness of the filter medium equal the total height of the outer contour region 15. The filter units 10 form a filter unit stack 19, which can have any number of filter units 10. The filter unit stack 19 is terminated by a distributor plate 20. This distributor plate 20 has a concentrate outlet 21 and a filtered fluid outlet 22. To connect the filtered spaces 26 between the support webs 12 to the filtered fluid outlet 22, the support webs 12 can have apertures (not shown). As an alternative, indentations may be formed in the distributor plate 20. The concentrate outlet 21 is in communication with the unfiltered flow nozzle(s) 13, so that the concentrated fluid can be removed from the filter unit stack 19. The filtered fluid connection 22 is connected to the filtered flow nozzle(s) 14, so that the filtered fluid can flow out of the filter unit stack 19. Opposite the distributor plate 20 is a connection plate 23, which has an unfiltered fluid inlet 24. The unfiltered fluid inlet 24 is connected to the unfiltered flow nozzle(s) 13. To connect the filtered spaces 26 to the filtered fluid outlet 22, apertures may be provided in the support webs or indentations in the connection plate 23, as described above.

The fluid being filtered flows in the direction of arrow A through the unfiltered fluid inlet 24 into the unfiltered flow nozzle 13 and thus into the filter unit stack 19. Between the upstream sides 17 facing each other of the filter medium 16, an unfiltered space 25 is formed into which the fluid being filtered flows. The unfiltered flow nozzles 13 distribute the fluid being filtered in all the unfiltered spaces 25 of the filter unit stack 19. The fluid flows into contact with the filter medium 16, such that the fluid to be filtered passes through the filter medium 16 in the direction of arrow B and collects in the filtered space 26 between the downstream sides 18 of the filter media 16 and then flows along the support webs 12 to the filtered flow nozzle 14. The filtered fluid, which may be as little as approximately 20% or less of the fluid introduced, exits the filter unit stack 19 through the filtered fluid outlet 22 in the direction of arrow C. The concentrated fluid, which may be as much as approximately 80% or more of the introduced fluid, flows in the direction of arrow D out of the filter unit stack 19 through the concentrate outlet 21.

Figure 3:
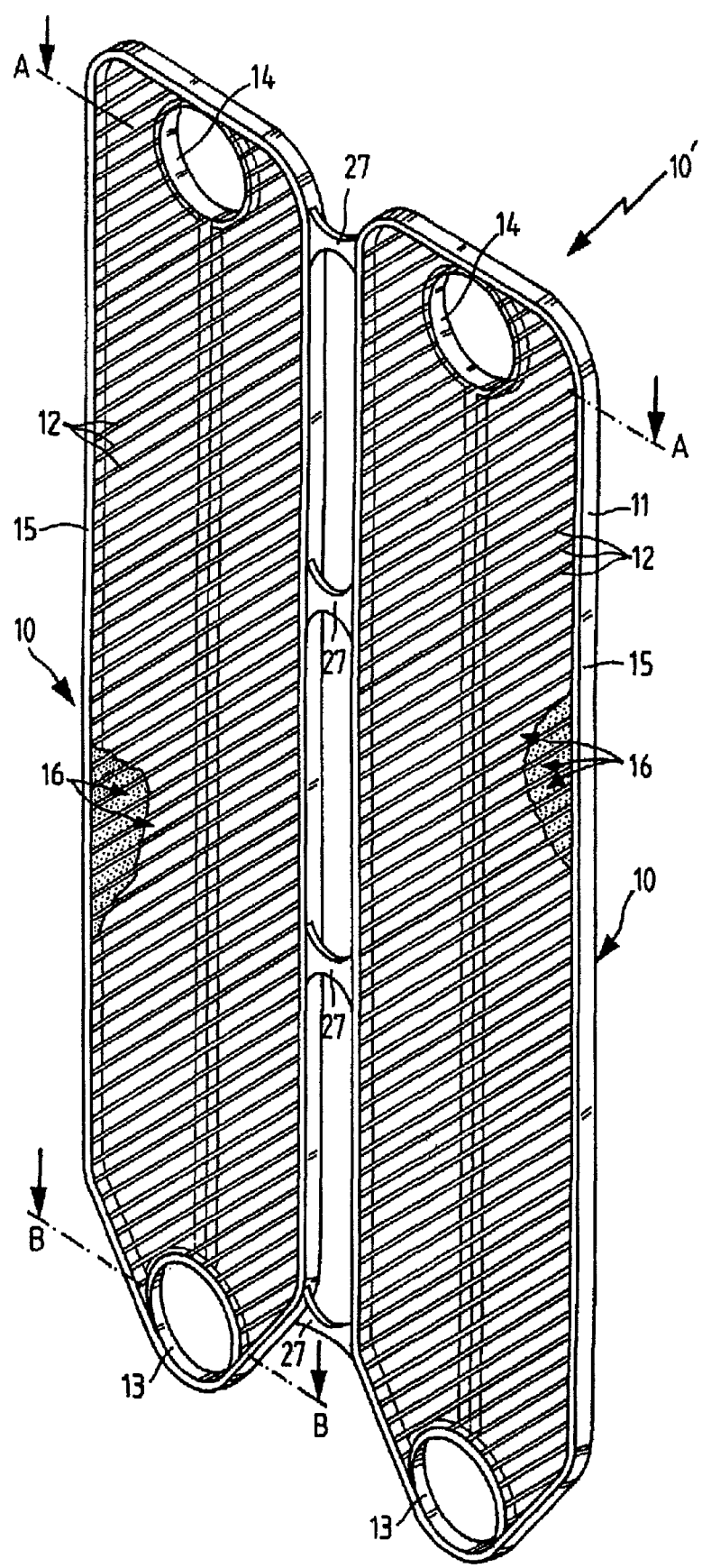
FIG. 3 is a view of a twin filter unit.

FIG. 3 shows a twin filter unit 10'. Once again, parts corresponding to those of FIG. 1 are identified by the same reference numerals. The twin filter unit 10' comprises two separate filter units 10 connected by webs 27. The interconnected filter units 10 are precisely positioned in relation to each other by the webs 27. Furthermore, a single mold can be used to produce twice the number of filter units 10. Another advantage of this embodiment is that the outer contour regions 15 have matching end faces, which fit precisely on top of each other during assembly. The geometry of the end faces of the outer contour regions 15 will be described in greater detail with reference to FIGS. 4 and 5. In the area of the unfiltered flow nozzles 13 the outer contour region 15 is funnel-shaped. This embodiment prevents contaminants from accumulating in the corner areas, which receive less flow. In the area of the filtered flow nozzle 14 the outer contour region 15 does not need to be funnel-shaped since there is little contaminant loading in this area.

Figure 4:
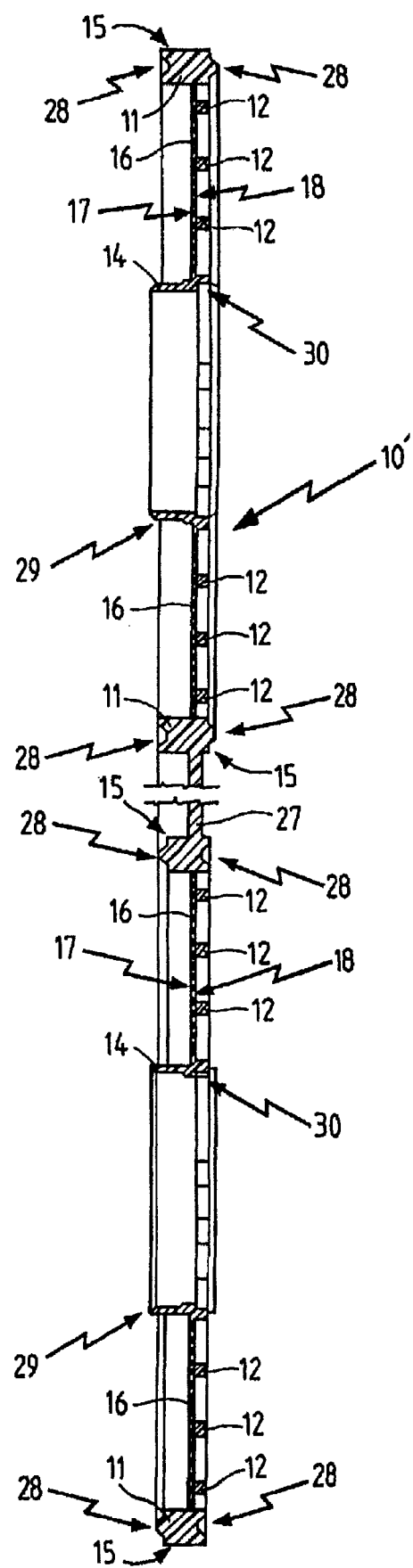
FIG. 4 is a sectional view of the twin filter unit of FIG. 3 taken along line A-A.

FIG. 4 shows a section of the twin filter unit 10' of FIG. 3 taken along line A-A. Again, parts corresponding to those of FIG. 3 are identified by the same reference numerals. The outer contour region 15 has end-face sealing contours 28. In the upper filter unit 10', the sealing contour 28 is convex on the side facing the support webs 12. In the lower filter unit 10' the side facing the support webs 12 is concave. The opposite sealing contour 28, which is disposed on the upstream side 17, has a negative contour to the sealing contour 28 associated with the support webs 12. Thus a concave sealing contour 28 is arranged opposite an end face that has a convex sealing contour 28. The upper filter unit 10' has the oppositely oriented sealing contour 28 relative to the lower filter unit 10'. The twin filter units 10' can therefore be stacked on each other in alternate direction such that the upstream sides 17 and the downstream sides 18 are facing each other respectively. Thus a single mold is sufficient to produce identical twin filter units 10', which can be assembled into a filter unit stack 19 as shown in FIG. 2. The filtered flow nozzle 14 is configured in such a way that a nozzle area 29 is provided which protrudes above the height of the frame 11. The filtered flow nozzle 14 further has a seating area 30 in which the nozzle area 29 of the adjacent filter unit 10 engages to produce a tight connection (see FIG. 6).

Figure 5:
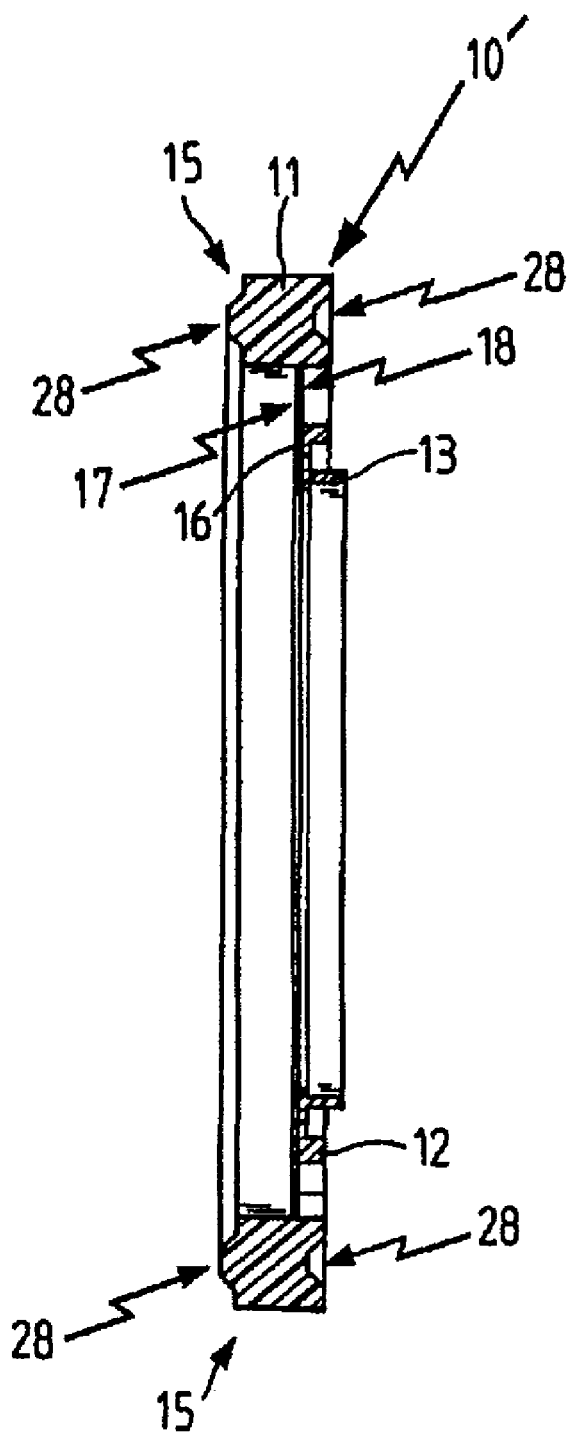
FIG. 5 is a sectional view of the twin filter unit of FIG. 3 taken along line B-B.

FIG. 5 is a section of the twin filter unit 10' of FIG. 3 taken along line B-B. Again, parts corresponding to those of FIGS. 3 and 4 are identified by the same reference numerals. Since the sealing contour 28 extends uniformly on an end face, the explanations given above with reference to FIG. 4 apply likewise to FIG. 5. The unfiltered flow nozzle 13 has geometries for sealing purposes similar to those of the filtered flow nozzle 14.

Figure 6:
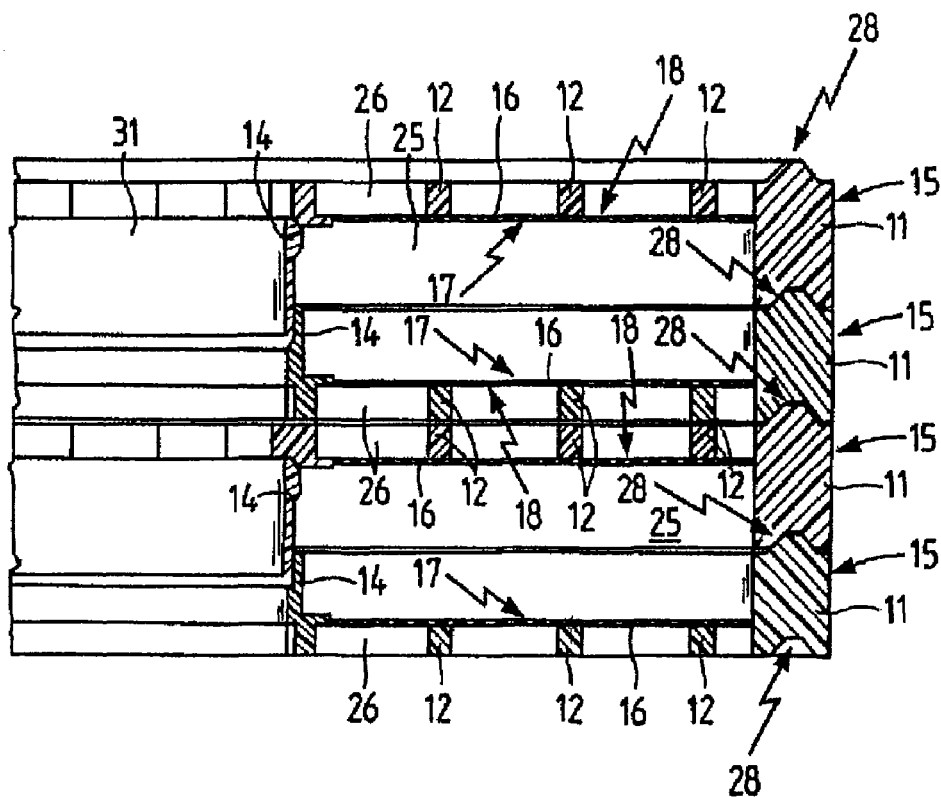
FIG. 6 is a sectional view through a stack of filter units taken along line A-A.

FIG. 6 is a partial section of stacked filter units 10 of FIG. 3 taken along line A-A. As already explained with reference to FIG. 5, the nozzle areas 29 engage in the seating areas 30, thereby producing a filtered fluid channel 31, which is sealingly separated from the unfiltered fluid space 25. The filtered fluid space 26 is formed by clearances between the support webs 12 and is connected to the filtered fluid channel 31. The sealing contours 28 of the frame 11 engage each other, such that the concave and the convex regions, respectively, are configured so that the flat regions of the frame 11 are first superimposed on each other and the curved regions are initially only used for centering. This has the advantage that the flat regions are first pressed together to form a seal before the curved regions contact each other in a planar manner. As a result smaller clamping forces are sufficient to assure a tight connection between stacked members.

Figure 7:
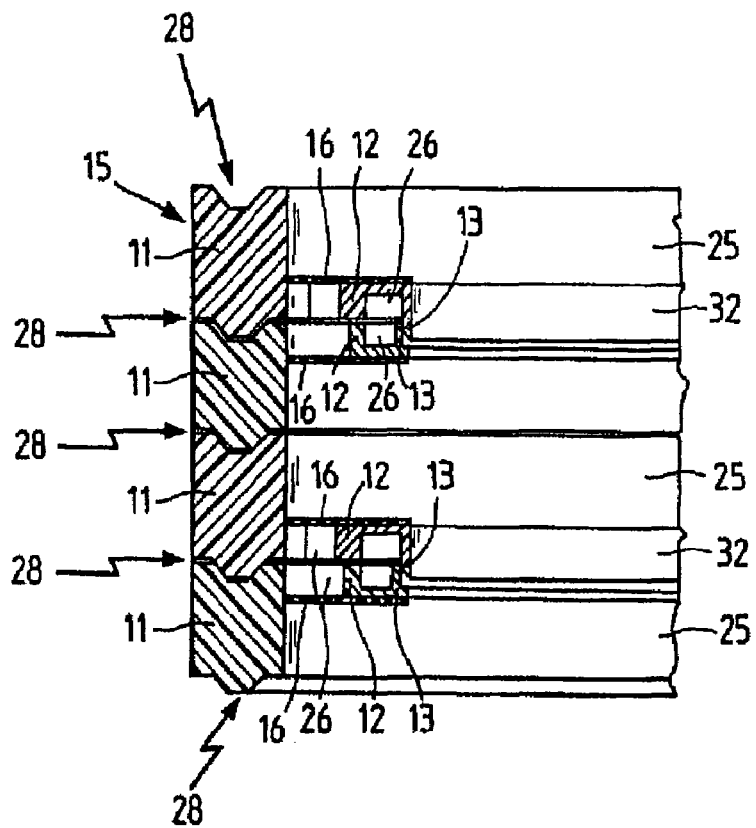
FIG. 7 is a sectional view through a stack of filter units taken along line B-B.

FIG. 7 is a partial sectional view of the stacked filter units 10 shown in FIG. 3 taken along line B-B. Parts corresponding to those of FIG. 5 are again identified by the same reference numerals. As the filter units 10 are stacked, the unfiltered flow nozzles 13 form the unfiltered fluid channel 32, which is connected to the unfiltered fluid space 25. The filtered fluid space 26 is separated from the unfiltered fluid space 25 by the filter medium 16.

Figure 8:
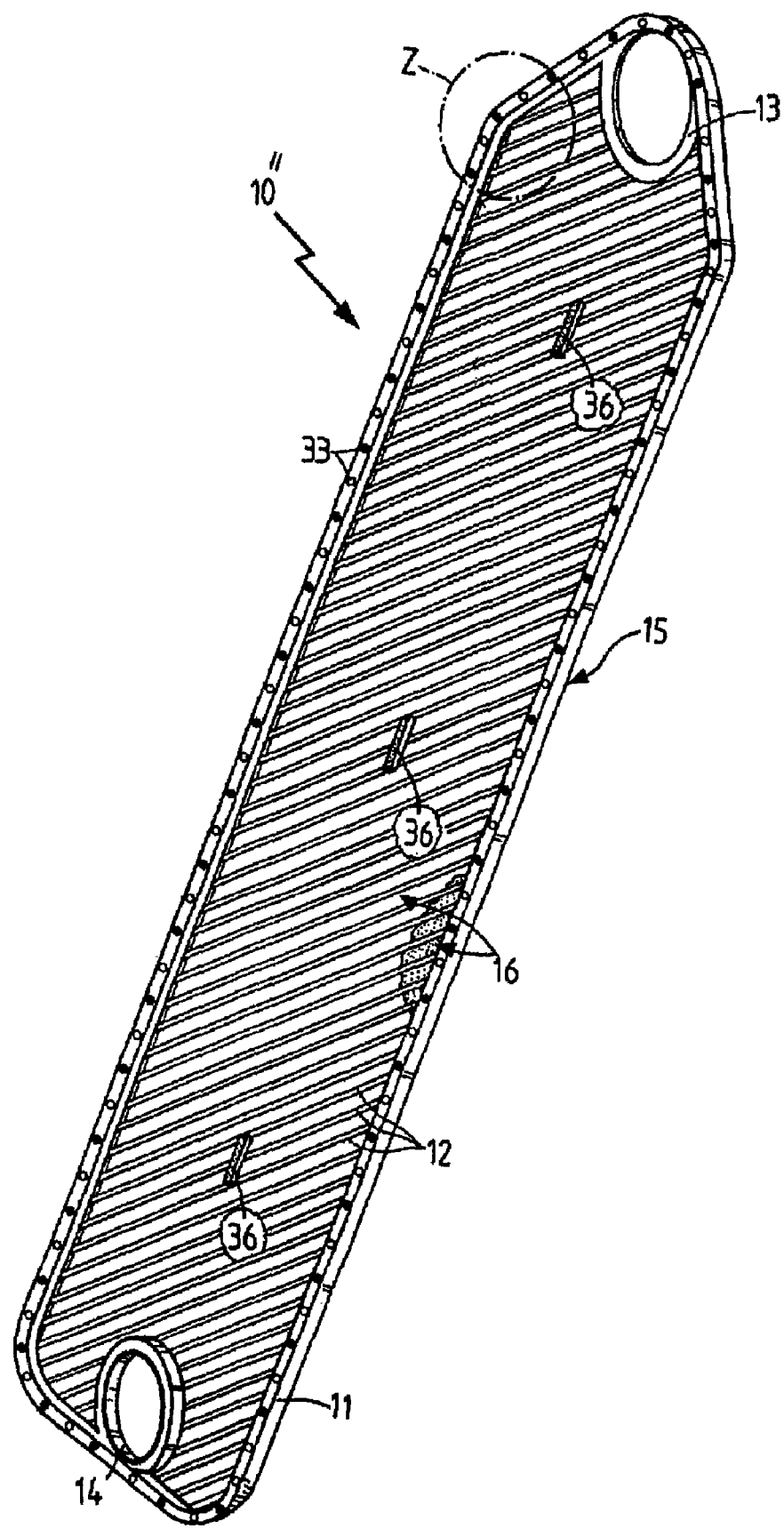
FIG. 8 is a perspective view of a filter unit according to the invention.
Figure 9:
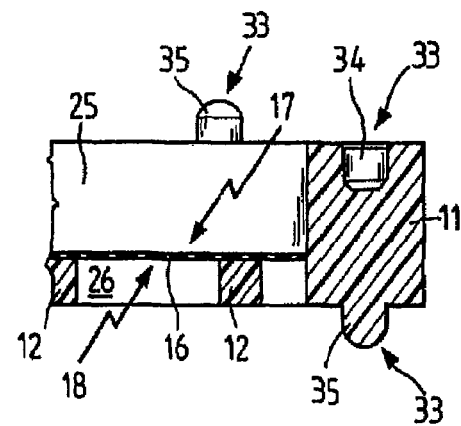
FIG. 9 is a detail view Z of a filter unit according to FIG. 8.

FIG. 8 shows a filter unit 10". Parts corresponding to those of FIG. 3 are again identified by the same reference numerals. The filter unit 10" comprises a frame 11 with an outer contour region 15 along which centering contours 33 are arranged on the end-face side. The centering contours 33 are formed as holes 34 and pins 35, as depicted in detail Z shown in FIG. 9. The holes 34 and the pins 35 are distributed around the end face, with the pins 35 registering with and engaging in the holes 34 of the adjacent filter unit 10" to position the filter units on each other. The number and distribution of the centering contours 33 depends on the size and geometry of the filter unit 10". The filter unit 10" further comprises support rails or webs 36, which are arranged on both sides of the filter medium 16. As a result the filter medium 16 is also supported on the upstream side, so that the filter unit 10" can be backwashed without excessively stressing the filter medium 16.

Figure 10:
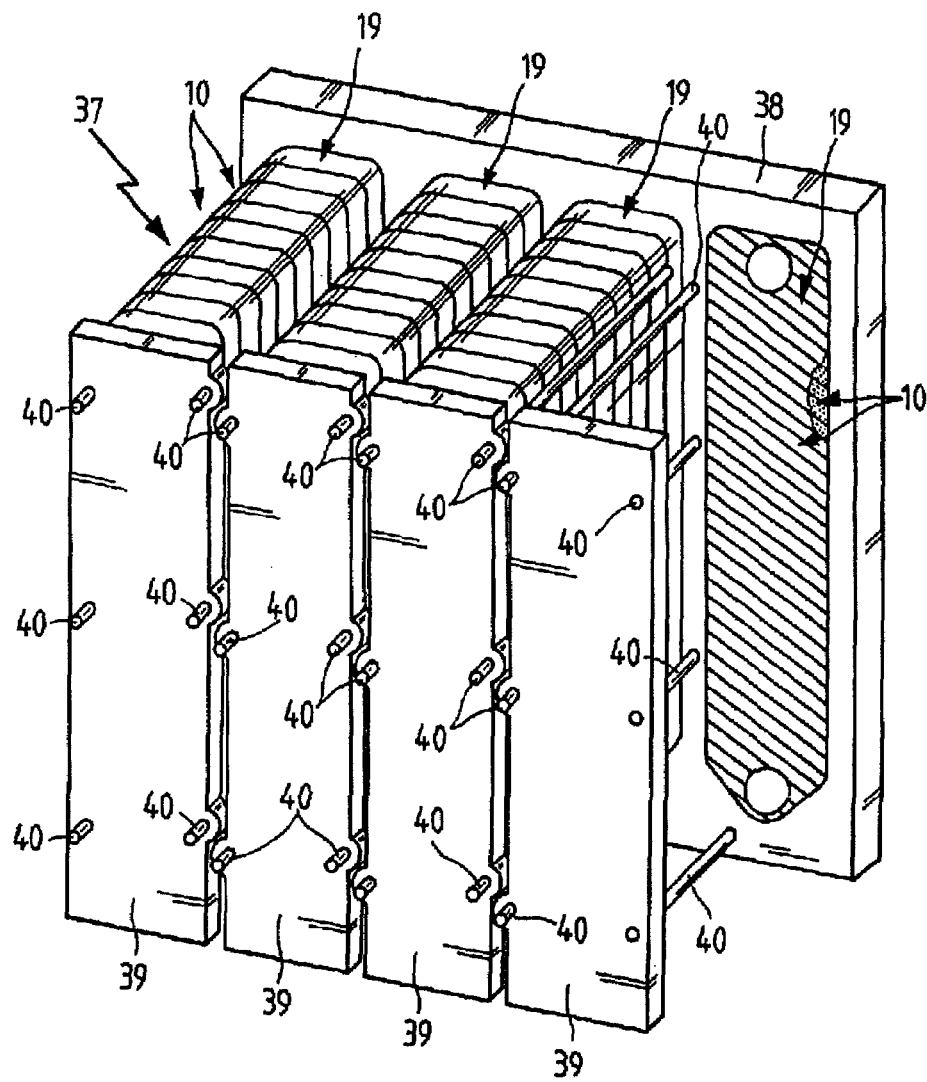
FIG. 10 is a perspective view of a filter unit module.

FIG. 10 shows a filter unit module 37. The filter unit module 37 has four filter unit stacks 19. In the drawing, one filter unit stack 19 at the right hand side is indicated only by a single filter unit 10. The filter unit stacks 19 are sealingly mounted between a distributor plate 38 and clamping plates 39. The individual filter units 10 are tightly clamped by clamping members 40, which are secured to the distributor plate 38 on the one hand and to the clamping plates 39 on the other. The clamping plates 39 are configured separately for each filter unit stack 19, so that tolerances in the filter units 10 can be compensated, and each filter unit stack 19 can be separately clamped with a predetermined clamping force.

Figure 11:
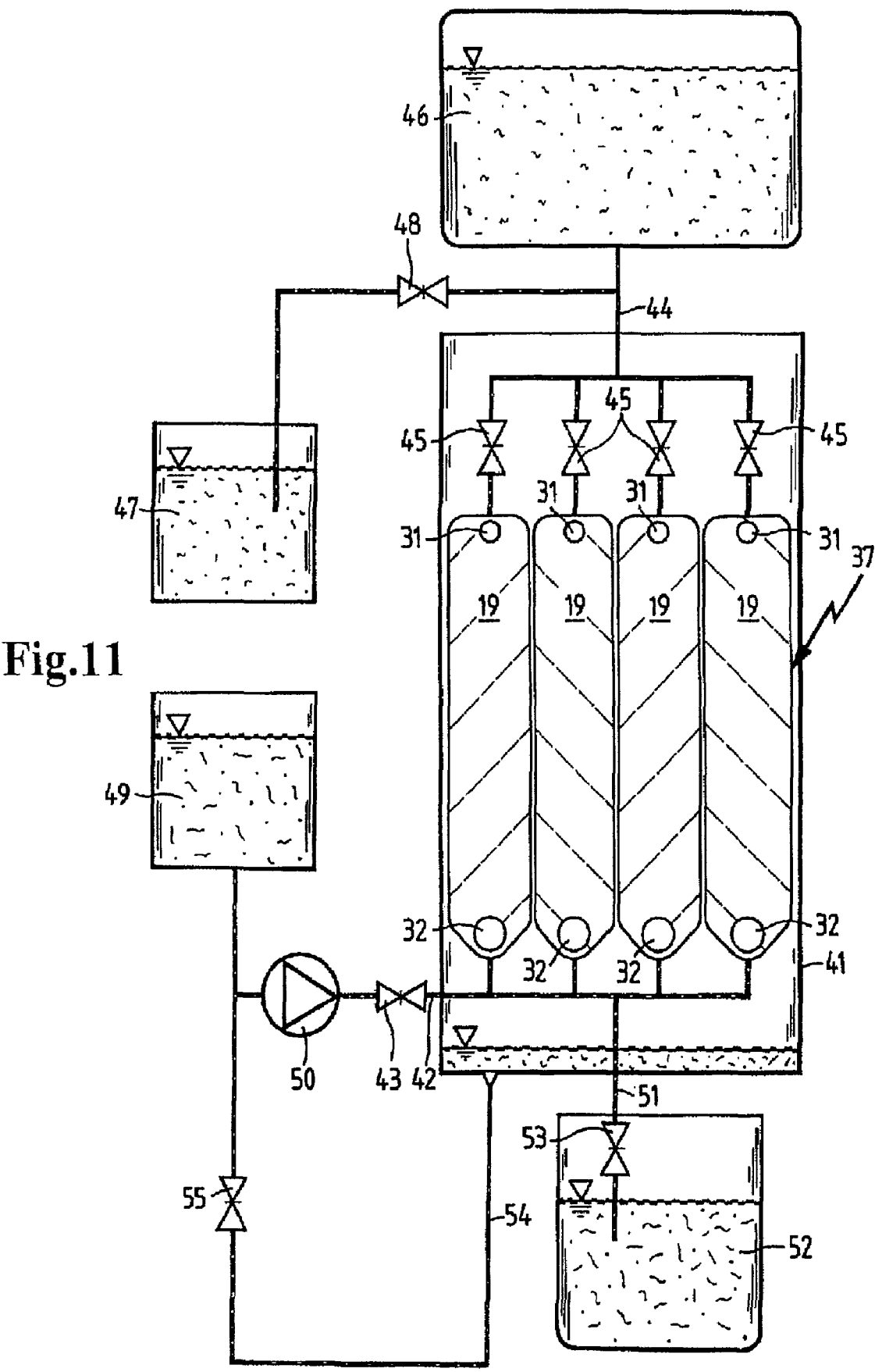
FIG. 11 is a schematic diagram of a filtration system.

FIG. 11 is a schematic diagram of a filtration system using filter units according to the invention. The filtration system comprises a tank 41, in which a filter unit module 37 with four filter unit stacks 19 as depicted in FIG. 10 is disposed. The filter unit module 37 has an unfiltered inlet 42, which can be opened and closed by a valve 43. The unfiltered inlet 42 is connected to the unfiltered fluid channel 32 of each filter unit stack 19. The filtered fluid channels 31 of the filter unit stack 19 are connected to a filtered fluid line 44, such that each filter unit stack 19 can be opened and closed by a separate valve 45. The filtered fluid line 44 opens into a backwash reservoir 46 on the one hand and into a filtered fluid tank 47 on the other. The filtered fluid tank 47 can be closed off from the filtered fluid line 44 by a valve 48.

The unfiltered inlet 42 is connected to an unfiltered fluid tank 49. A pump 50 is provided to force the fluid to be filtered into the filter unit module 37. The unfiltered inlet 42 is furthermore connected to a concentrate line 51, which opens into a container 52. The concentrate line 51 can be opened and closed by a valve 53.

The tank 41 has a discharge line 54, which can be opened and closed by a valve 55. The discharge line 54 is connected to the unfiltered fluid tank 49, so that the fluid collected in the tank 41 can be returned to the unfiltered fluid tank 49.

The fluid to be filtered is located in the unfiltered fluid tank 49. From there it is pumped into the filter unit module 37 through the unfiltered inlet 42 when the valve 43 is open. In this state, the valve 53 is closed. At least one of the valves 45 is open, so that the filtered fluid can exit the filter unit module 37 through the filtered fluid line 44. The filtered fluid flows into the backwash reservoir 46 or, if valve 48 is open, into the filtered fluid tank 47 from where it can be supplied for further use. If one or more of the filter unit stacks 19 is dirty, the valve 48 is closed and the respective valve 45 is opened so that the filter unit stack 19 can be backwashed. For this purpose, valve 43 is also closed and valve 53 in the concentrate line 51 is opened. The dirty backwash fluid is collected in the container 52. When the fluid contained in the filter unit module 37 cannot be filtered any further, the fluid is removed from the filter unit module 37 via the concentrate line 51. When the container 52 is full, it is replaced or emptied. The concentrate is then disposed of. Since the filter units 10 (according to the figures described above) are only clamped together, minor leaks may occur. Any leaked fluid is then collected in the tank 41 and is removed from the tank 41 through the discharge line 54.

The filter unit stacks 19 may selectively receive flow and be backwashed by operation of the appropriate valves 45.

Figure 12:
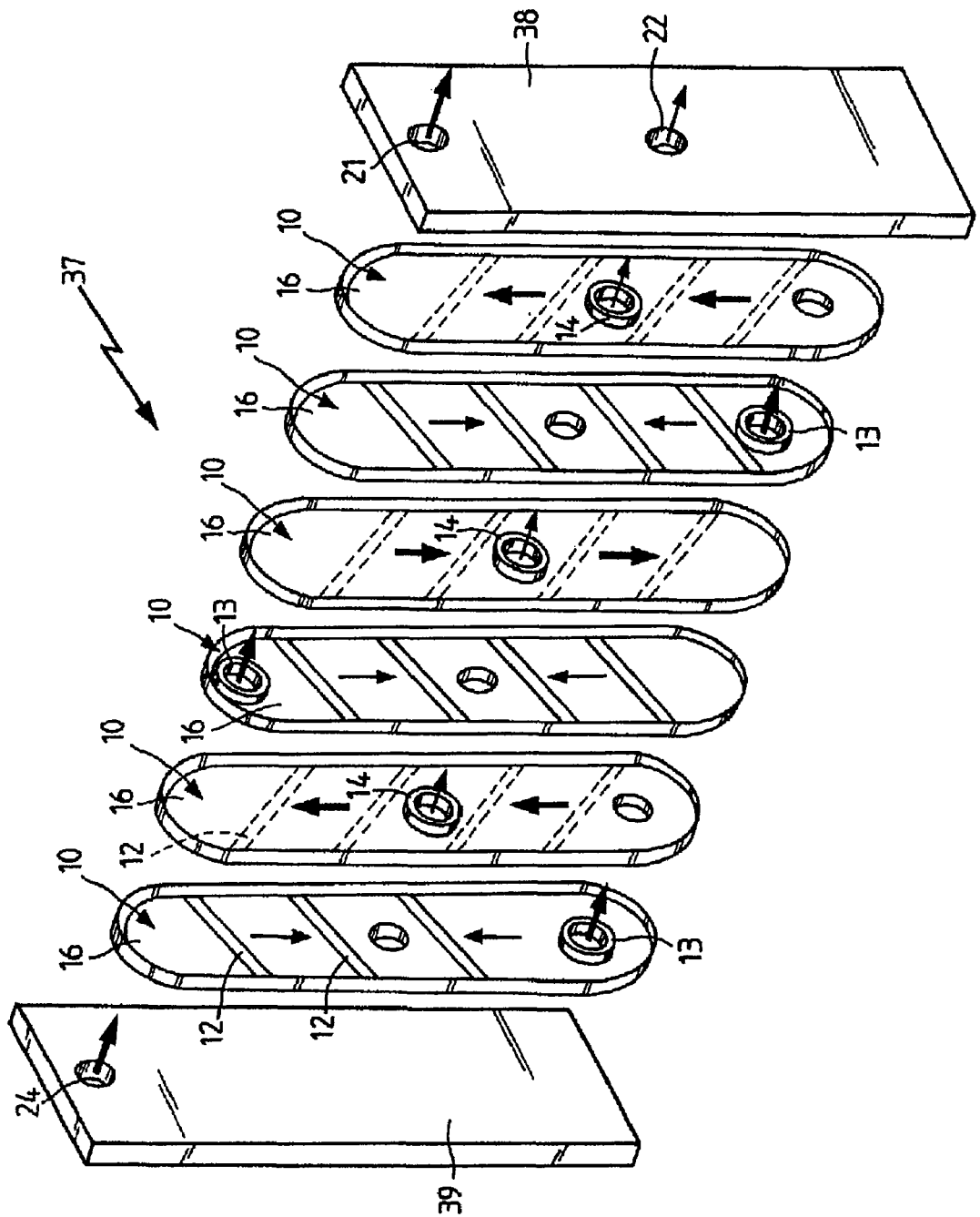
FIG. 12 is a flow diagram showing flow through a filter according to the invention.

The flow path through the filter device is schematically illustrated in the exploded view of a filter unit module 37 of FIG. 12. The unfiltered fluid inlet 24 is disposed in the clamping plate 39. The filtered fluid outlet 22 and the concentrate outlet 21 are disposed in the distributor plate 38. The filter units 10 are depicted schematically and correspond to the filter units 10 described with reference to the preceding figures. The fluid to be filtered flows through the unfiltered fluid inlet 24 into the filter unit module 37 (thick arrow). Between the clamping plate 39 and the first filter unit 10, the fluid flows downwardly to the unfiltered flow nozzle 13. In the region of the filter medium 16, previously filtered fluid passes through and flows through the filtered flow nozzle 14 in the second filter unit 10 toward the filtered fluid outlet 22 (thin arrow). The introduced unfiltered fluid flows through the unfiltered flow nozzle 13 into the next unfiltered space (thick arrow). The fluid flows through the individual unfiltered spaces until the fluid is discharged as a concentrate from the filter unit module 37 through the concentrate outlet 21. Thus, the concentrate stream is guided across all the filter units 10. The filtered fluid flows (along the thin arrows) through the filtered spaces to the filtered flow nozzles 14 and then exits the filter unit module 37 through the filtered fluid outlet 22.

Figure 13:
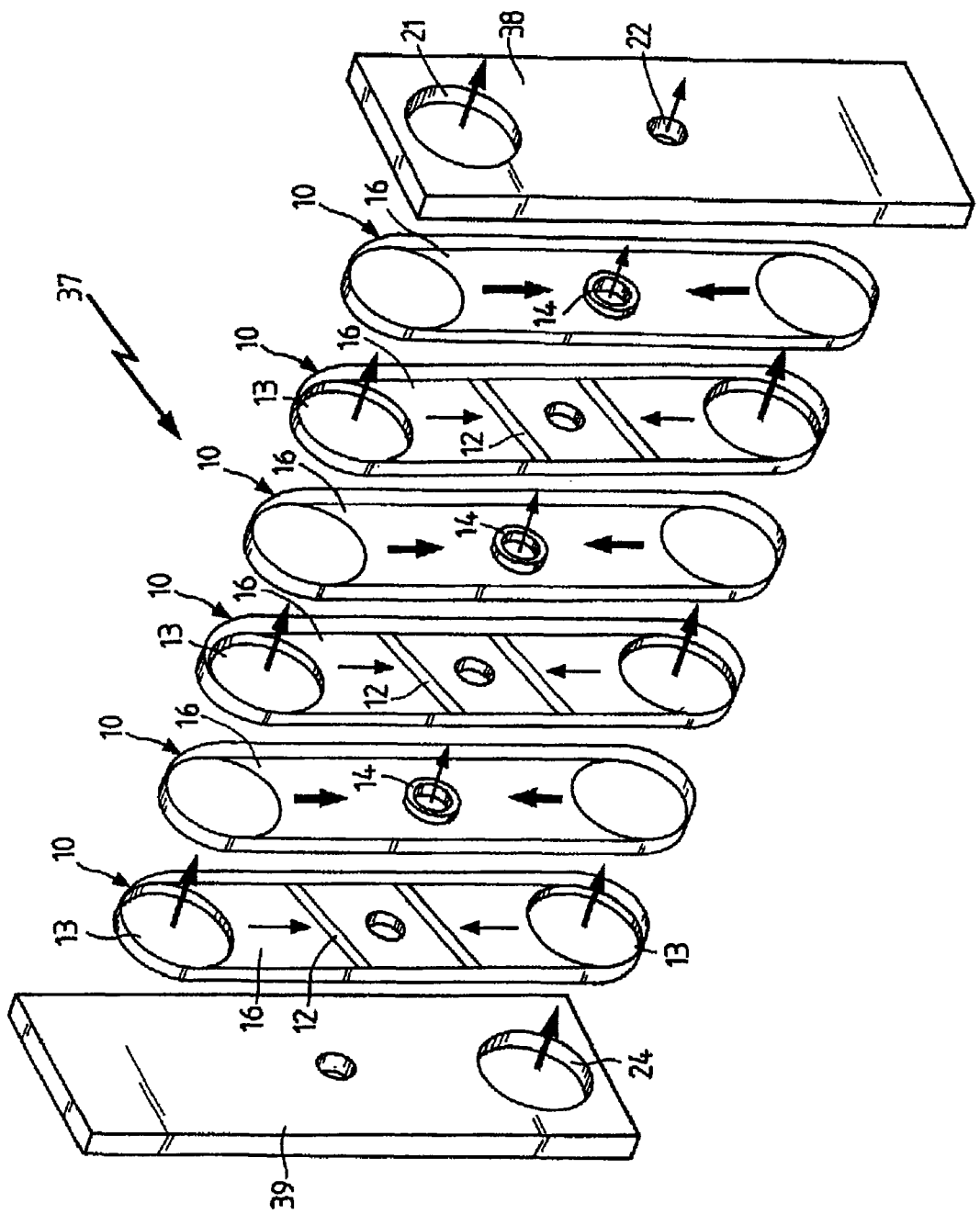
FIG. 13 is an alternative flow diagram.

FIG. 13 shows an alternative flow path to the flow path depicted in FIG. 12. Parts corresponding to those shown in FIG. 12 are identified by the same reference numerals. The difference compared to the flow path described in FIG. 12 is that each filter unit 10 has two unfiltered flow nozzles 13. As a result, the concentrate stream no longer needs to be guided across all filter units 10, which is advantageous particularly for the backwashing of the filter units.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter unit for filtering a fluid, said filter unit comprising a frame and a filter medium mounted on and sealingly connected to the frame, wherein said frame has an outer contour region which extends on both the upstream side and the downstream side of the filter medium, said frame forming an unfiltered flow nozzle for discharging unfiltered fluid upstream of the filter medium and a filtered flow nozzle for collecting filtered fluid downstream of the filter medium, and said frame further comprising a plurality of support webs for the filter medium disposed on the downstream side of the filter medium, said filter medium being connected to said support webs and being sealingly fixed to the unfiltered flow nozzle, wherein the unfiltered flow nozzle has a height $H_{unfiltered}$ at least as high as the height $H_{contour}$ of the outer contour region extending on the downstream side of the filter medium, and wherein the filter medium also is sealingly fixed to the filtered flow nozzle, and the filtered flow nozzle has a height $h_{filtered}$ at least as high as the height $h_{contour}$ of the outer contour region extending on the upstream side of the filter medium.

2. A filter unit according to claim 1, wherein the support webs extend diagonally to the outer contour region.

3. A filter unit according to claim 1, wherein the frame has a sealing contour in the area of the outer contour region, said sealing contour having a concave contour on one end face of the frame and a mating convex contour on an opposite end face of the frame, whereby a plurality of filter units can be sealingly stacked.

4. A filter unit according to claim 1, wherein a centering contour is formed on at least one end face of the outer contour region of the frame.

5. A filter comprising a stack of at least two filter units according to claim 1, wherein the frames of the adjacent filter units sealingly adjoin each other, and wherein the unfiltered fluid flow nozzles of adjacent filter units adjoin each other to form an unfiltered fluid flow channel and filtered fluid flow nozzles of the adjacent filter units adjoin each other to form a filtered fluid flow channel, and wherein the support webs of the adjacent filter units face and mutually support each other.

6. A filter device for filtering a fluid said device comprising a tank, an unfiltered fluid connection, a filtered fluid connection and a concentrate connection, wherein at least one filter according to claim 5 is disposed inside the tank, and wherein the unfiltered fluid flow channel is connected to the unfiltered fluid connection and the concentrate connection, and the filtered fluid flow channel is connected to the filtered fluid connection.

7. A filter device according to claim 6, wherein the stack of filter units is clamped together by a clamping member having one end fixed to a distributor plate at one end of the stack of filter units and a second end fixed to a clamping plate at the other end of the stack of filter units.

8. A method of filtering a fluid, said method comprising:
providing a filter device according to claim 6;
introducing unfiltered fluid into the filter unit stack through the unfiltered fluid connection and the unfiltered fluid flow channel into an unfiltered fluid zone arranged between facing upstream sides of the filter medium of two adjacent filter units;
passing a portion of fluid through the filter medium of one filter unit to a filtered fluid zone arranged between facing downstream sides of the filter medium of said one filter unit and a third filter unit, whereby the fluid is filtered;
discharging filtered fluid from the filtered fluid zone through the filtered fluid flow channel and the filtered fluid connection; and
discharging a remaining portion of the unfiltered fluid as a concentrate from the unfiltered fluid zone through unfiltered fluid flow channel and the concentrate connection.

9. A method according to claim 8, further comprising periodically backwashing the filter units to clean the filter medium.

\* \* \* \* \*